United States Patent [19]
Dolfing et al.

[11] Patent Number: 6,084,985
[45] Date of Patent: Jul. 4, 2000

[54] METHOD AND APPARATUS FOR ON-LINE HANDWRITING RECOGNITION BASED ON FEATURE VECTORS THAT USE AGGREGATED OBSERVATIONS DERIVED FROM TIME-SEQUENTIAL FRAMES

[75] Inventors: Jannes G. A. Dolfing, Eindhoven, Netherlands; Reinhold Häb-Umbach, Aachen, Germany

[73] Assignee: U.S. Philips Corporation, New York, N.Y.

[21] Appl. No.: 08/943,532

[22] Filed: Oct. 3, 1997

[30] Foreign Application Priority Data

Oct. 4, 1996 [EP] European Pat. Off. .............. 96202779

[51] Int. Cl.[7] .............................. G06K 9/00; G06K 9/18; G06K 9/62; G06K 9/72
[52] U.S. Cl. ......................... 382/187; 382/186; 382/188; 382/228; 382/229
[58] Field of Search ..................................... 382/186, 187, 382/188, 203, 228, 229, 116

[56] References Cited

U.S. PATENT DOCUMENTS 5,621,809  4/1997  Bellegarda et al. .................... 382/116

OTHER PUBLICATIONS

Krishna S. Nathan et al, "Real–Time On–Line Unconstrained Handwriting Recognition Using Statistical Methods", pp. 2619–2622, 1995 IEEE.

Eveline J. Bellegarda et al, "A Fast Statistical Mixture Algorithm for On–Line Handwriting Recognition", pp. 1227–1233, IIIE Transactions on Pattern Analysis and Machine Intelligence, vol. 16, No. 12, Dec. 1994.

M. Schenkel et al, On–Line Cursive Script Recognition Using Time–Delay Neural Networks and Hidden Markov Models, pp. 215–223, 1995 Machine Vision and Applications.

"Application of Hidden Markov Models for Signature Vierification" L. Yang et al, Pattern Recognition, vol. 28, No. 2, Mar. 1995.

*Primary Examiner*—Phuoc Tran
*Assistant Examiner*—Daniel G. Mariam
*Attorney, Agent, or Firm*—Brian J. Wieghaus

[57] ABSTRACT

A method for on-line handwriting recognition is based on a hidden Markov model and implies the following steps: sensing real-time at least an instantaneous write position of the handwriting, deriving from the handwriting a time-conforming string of segments each associated to a handwriting feature vector, matching the time-conforming string to various example strings from a data base pertaining to the handwriting, and selecting from the example strings a best-matching recognition string through hidden-Markov processing, or rejecting the handwriting as unrecognized. In particular, the feature vectors are based on local observations derived from a single segment, as well as on compacted observations derived from time-sequential segments.

18 Claims, 5 Drawing Sheets

METHOD AND APPARATUS FOR ON-LINE HANDWRITING RECOGNITION BASED ON FEATURE VECTORS THAT USE AGGREGATED OBSERVATIONS DERIVED FROM TIME-SEQUENTIAL FRAMES

BACKGROUND TO THE INVENTION

The invention relates to a method for on-line handwriting recognition.

Human speech is presently being recognized by data processing methods that use hidden Markov processes and neural networks. Of late, similar algorithms are being used for online recognizing human handwriting during writing thereof. In the case of standard text, recognizing may imply correlating with various letter models, and assigning a particular letter sequence to the writing. In the case of a signature, recognizing may imply correlating with various different signatures, or rather verifying through correlating with just one signature. The modellings may be descriptions on some level of abstraction of the eventual text. The outputting may be restricted further with respect to the recognition, such as in the form an ASCII series, a stylized representation of the handwriting, the reproduction as spoken text, or just a yes/no output in the case of verification E. J. Bellegarda et al., A Fast Statistical Mixture Algorithm for On-line Handwriting Recognition, *IEEE Transactions on Pattern Analysis and Machine Intelligence,* 16(12) p.1227–1233, December 1994, describes letter recognition based on a splicing mechanism. K. S. Nathan et al., Real-time On-line Unconstrained Handwriting Recognition Using Statistical Methods, *International Conference of Acoustics, Speech and Signal Processing,* p.2619–2622, 1995, describes complete handwriting recognition based on a hidden Markov model (HMM).

Now, the present inventors have found that associating each handwriting interval with only a single feature vector, yields unsatisfactory recognition results. It is possible to derive each feature vector from all information present in a sequence of a plurality of handwriting intervals; this however leads to a sharply increased dimension of the feature vectors in terms of the number of components thereof, and requires unwieldy calculations, without yielding a corresponding improvement of the results. In consequence, there appears to be ample room for attaining improved effectivity of the present state of the art.

SUMMARY TO THE INVENTION

Accordingly, amongst other things, it is an object of the present invention to provide a calculation model that allows a relatively higher recognition score at a relatively lower processing cost. The invention generally concerns handwriting recognition including real-time sensing at least an instantaneous write position of the handwriting, deriving from the handwriting a time-conforming string of samples, and from the string a series of handwriting intervals each associated by derivation to a handwriting feature vector, matching the time-conforming sequence of feature vectors so derived to one or more example sequence modeling from a database pertaining to the handwriting in question, selecting from the modeling a sufficiently-matching recognition string through hidden-Markov processing, and outputting essentials of a result of the selecting, or alternatively, rejecting the handwriting as failing to be recognized. Now, according to one of its aspects, the invention is characterized in that said feature vectors contain one or more vector elements that are based on local observations derived from a single said handwriting interval, as well as one or more vector elements that are based on aggregated observations derived from time-spaced said intervals defined over an associated delay. Through the aggregation, the size of the feature factors in terms of the number of vector elements is kept much lower than the size that would follow from the combined information from a sequence of handwriting intervals. Nevertheless, the recognition quality is excellent. It has been felt that this result derives from the following characterizations of the recognition model:

a. the aggregated observations relate to a temporal or spatial sequence of handwriting intervals that in combination have an adjustable duration or delay; this delay can have a greater or smaller value to adjust to handwriting idiosyncrasies of the singular person in question. Another variable can be the particular type of information that the vector element in question relates to: a handwriting contour may use a greater delay than angles between various shapes of the writing.

b. the aggregation result has a smaller number of vector elements in the feature vectors, thereby allowing the full execution of relatively many process steps which each take a number of calculations that increases with this size.

According to the invention, the handwriting intervals may be delimited as a uniform number of samples, in which case they are called frames. Alternatively, the handwriting intervals may be delimited by characteristic locations or instants in the handwriting, in which case they are called segments. A particularly advantageous aspect for integrating is to calculate differential angles between points pertaining to successive handwriting intervals. The method can be used for standard handwriting text, or for the verification of signatures.

Advantageously, the aggregated feature vector elements comprise differential angles derived from principal points associated to successive handwriting intervals. This has been found a particularly distinguishing aspect, which moreover is straightforward to calculate.

Advantageously, said feature vector elements to be aggregated include spatial path lengths between principal points associated to successive handwriting intervals. This has been found a particularly distinguishing aspect. The path in question may be measured in the X-and/or Y-direction, or along a path of the writing itself.

For signature recognition or verification, advantageously at least one aggregated feature vector element is based on sensing instantaneous writing pressure. The sensing of either the pressure or the tilt of a writing instrument have become feasible with an electromagnetically operating writing tablet, that is based on electromagnetic loops arranged immediately below the surface.

The invention also relates to a data processing apparatus arranged and programmed for implementing the handwriting recognition method according to the invention. Further advantageous aspects of the invention are described herein.

BRIEF DESCRIPTION OF THE DRAWING

These and other aspects and advantages of the invention will be discussed more in detail hereinafter with reference to the disclosure of preferred embodiments, and more in particular with reference to the appended Figures. First, the general environment of the invention is discussed. Next, the implementation of the invention is disclosed in detail. Finally, a few results are presented. The Figures show in particular.

THE ENVIRONMENT OF THE INVENTION

Figure 1:
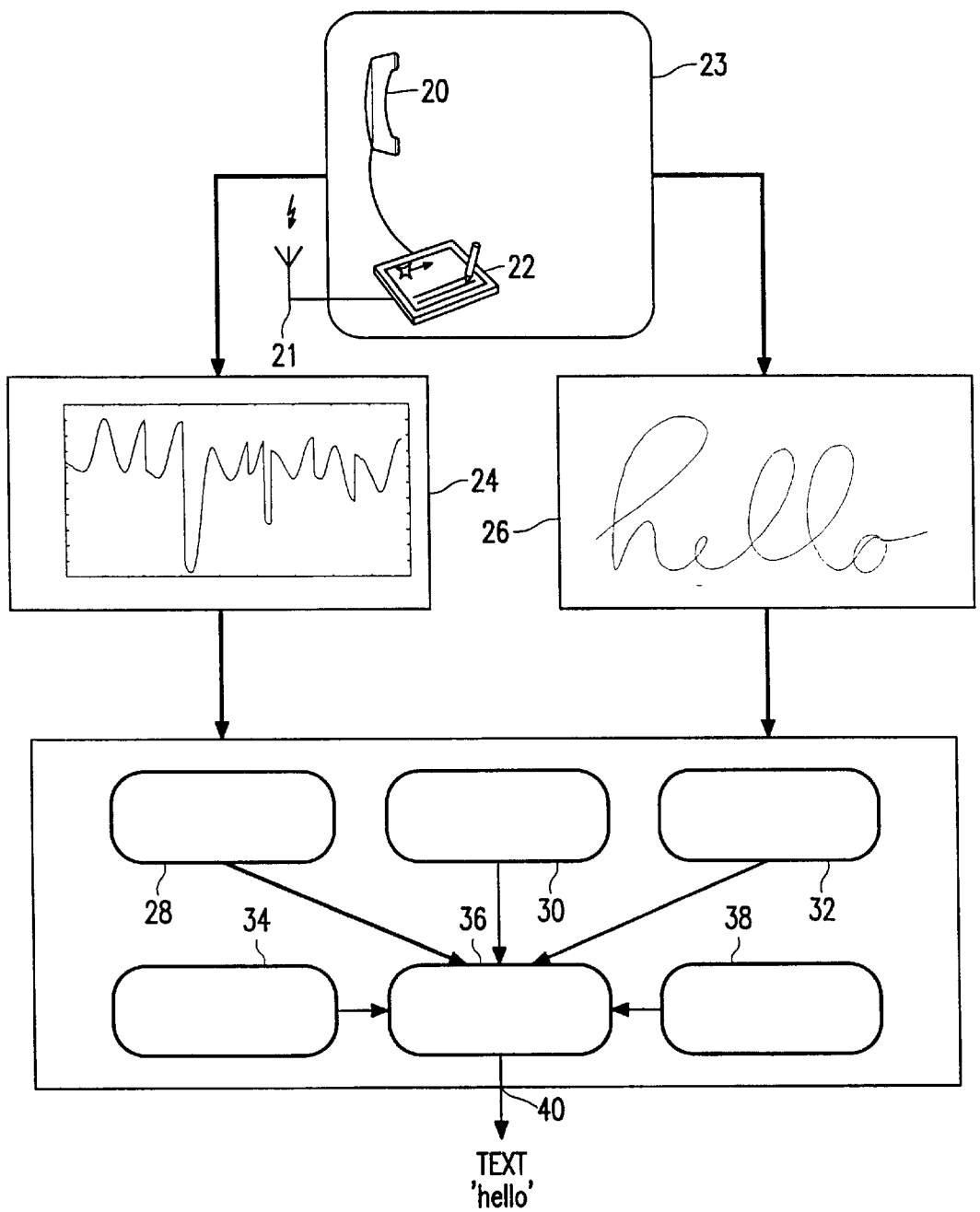
FIG. 1, a diagram of a two-channel recognition system.

FIG. 1 shows a bi-channel recognition system, voice at left and handwriting and/or signature recognition at right. Input 23 comprises a telephone-type voice input subsystem 20 and a graphical input tablet 22. Information gathered may be transferred by wireless 21 to a central data processing system not shown. Block 24 symbolizes instantaneous speech signal, block 26 instantaneous handwriting signal. As to the speech signal, the system contains acoustic preprocessor 28, search and classification 36, language model 30, acoustic model 34 that accounts for observation/feature vectors and a word sequence module, and finally outputs a result 40. As to the handwriting signal, there is a handwriting preprocessor 32, and a handwriting model description 38.

Figure 2:
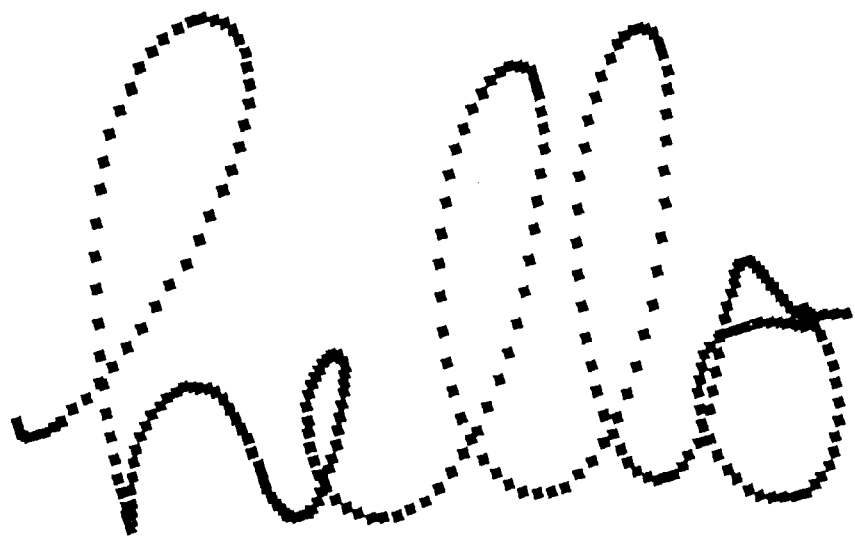
FIG. 2, an example of text sampling.

FIG. 2 is an example of text sampling, each block representing a particular sample. As shown, inter block-separation can vary by a factor of ten or more.

Figure 3A:
FIG. 3A, another example of a text.
Figure 3B:
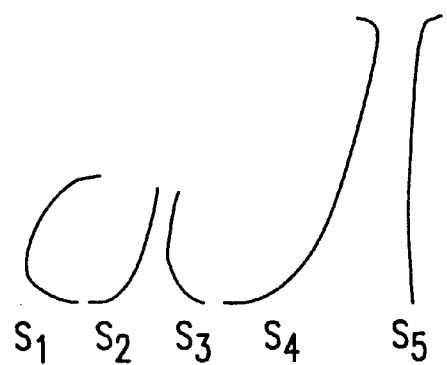
FIG. 3B, the breakdown thereof into segments.

FIG. 3A is another text specimen used for exemplifying further processing. The pen is assumed to move in an X, Y coordinate system. FIG. 3B shows the breakdown of FIG. 3A's example into five successive segments $S_1$–$S_5$: a segment terminates when the Y-velocity has become zero. Now suppose that segment $S_4$ is the current segment. Feature extraction from this single segment produces an observation $o_4$ that can be used as an element of a feature vector. Various such features have been in use in the art. It is clear that observation $o_4$ contains only local information that exclusively pertains to the segment in question. Now according to the invention, aggregated features will be constructed, such as aggregated observation $o'_4$ on the basis of observation $o_4$, and furthermore by describing relations between observations $o_4$, $o_3$, $o_2$. Another way of interpreting is to consider this as a system with three delay taps. In the course of time, other subsets of segments will be aggregated, such as observations $o_3$, $o_2$, $o_1$, etcetera. Negative delay values are feasible.

Figure 4A:
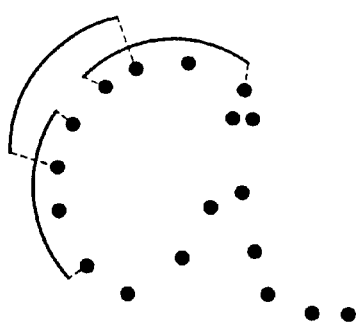
FIG. 4A, an exemplary frame path.

By way of example, FIG. 4A shows a frame path, that gives the grouping of successive samples of a particular written letter into fixed-size frames. Here, each frame has four samples, and moreover, Successive frames overlap by 50%: four successive frames have been shown, that roughly cover the top, the top left, and the left side of the single character, respectively. The overlap is optional. These frames can be used for deriving various feature vector elements, such as observations represented by instantaneous curvature of the handwriting.

Figure 4B:
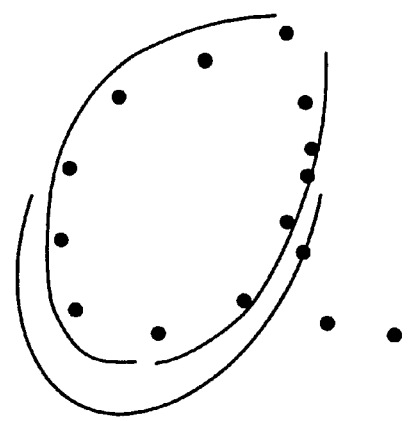
FIG. 4B, an exemplary segment path.

By way of alternative, FIG. 4B shows an exemplary segment path. Here, the delimiting between successive odd-numbered segments is effected at instants where vertical (Y)-speed is zero. Even-numbered segments again overlap half of both their predecessor and of their successor segment. Hereinafter, in particular, the odd-numbered frames are used for aggregating feature vector elements associated thereto. The features in a feature vector are chosen to be size-independent. The splitting points on $v_y=0$ guarantee a uniform number of segments per character, independent of character size. Hence, the 'segment' representation is automatically size-independent. In similar manner, the aggregating among even-numbered segments yields aggregated feature vector elements that are size-independent.

The preprocessing, of FIG. 1 in the first place derives from each such segment or frame various features that may collectively be aggregated into a feature vector element for the frame or segment in question, according to: $O=(o_1,o_2,o_3)$ So-called spliced feature vectors have been derived according to the state of the art by combining into a particular feature vector various features derived from successive frames or segments, without aggregation on the level of the features themselves. This often raises the size of the feature vector to an unmanageable level. According to the present invention, the size of these vectors is kept much lower, by aggregating individual features of successive frames or segments into a single aggregated feature, symbolically representable as:

$$\begin{array}{cc} o_1 & o_2 \\ f_1(o_1 \ldots o_{1-d}) & f_1(o_2 \ldots o_{2-d}) \\ o'_1 = f_2(o_1 \ldots o_{1-d}) & o'_2 = f_2(o_2 \ldots o_{2-d}) \\ \ldots & \ldots \\ f_m(o_1 \ldots o_{1-d}) & f_m(o_2 \ldots o_{2-d}) \end{array}$$

Herein, d as expressed in a number of segments, corresponds to the maximum value of the delay among successive frames or segments, and m indicates the number of functions actually used. Further, like with 'delta' features, observations relating to future segments can be aggregated into the actual feature vector as well.

Figure 5:
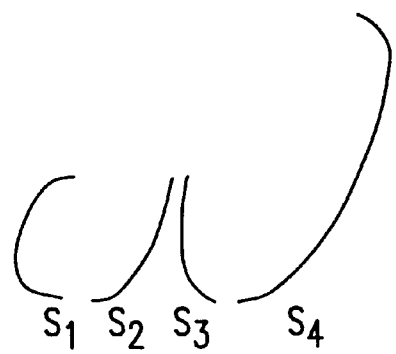
FIG. 5, another example of a sequence of segments.
Figure 6:
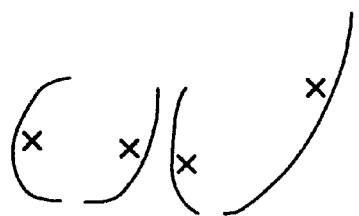
FIG. 6, ditto of the feature center of gravity.
Figure 7:
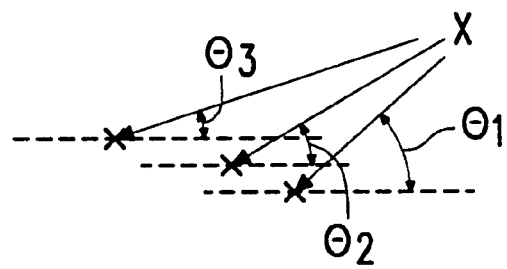
FIG. 7, ditto of the feature relative delayed angles.

FIG. 5 gives another example of a segments sequence. First, from the samples associated to each segment the center of gravity is calculated, wherein each respective sample accounts for a uniform weight. These centers of gravity have in FIG. 6 been shown as a cross appertaining to each segment. Alternative calculations may take either only the y coordinate value or only the x-coordinate value and the intersection of such coordinate with the character stroke. Through connecting a series of predecessor centers of gravity to an actual center of gravity, FIG. 7 shows the feature of relative delayed angles. As shown, four angles are produced, that may yield an aggregated feature vector according to:

$$o_4'=(o_4, \sin\theta_1, \sin\theta_2, \sin\theta_3),$$

which combines the original local information, together with a relevant part of 3×2 further features. The aggregated vector has a smaller size compared to the number of contributing features.

In a comparable manner, the size calculation of the various frames or segments $l_1 \ldots l_4$ can be used for constituting an aggregated vector based on successive segments according to:

$$o_4''=(o_4,(l_4/(l_3+l_4)),(l_4/(l_2+l_4)),(l_4/(l_1+l_4))).$$

Again, the size of the aggregated feature vector is reduced.

Figure 8:
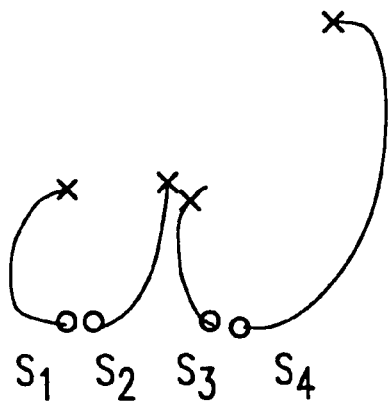
FIG. 8, ditto of the feature contour information.
Figure 9:
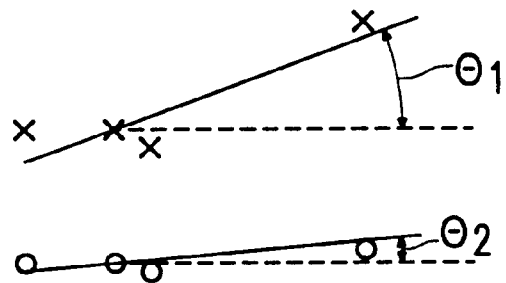
FIG. 9, ditto of the feature relative contour angle.

FIG. 8 shows the deriving of the feature aggregated contour information. First, as shown, top and bottom samples of each segment $s_1 \ldots s_4$ are determined, as indicated by crosses and circles, respectively. For the subsets of segments shown, separate regression lines are now calculated for the tops and bottoms, respectively, and the angles associated to these lines are used for producing the aggregated feature vector for these four segments or frames, such as according to:

$$o_4' = (o_4, \sin \theta_1, \sin \theta_2),$$

the latter two elements representing contour information (FIG. 9).

Figure 10:
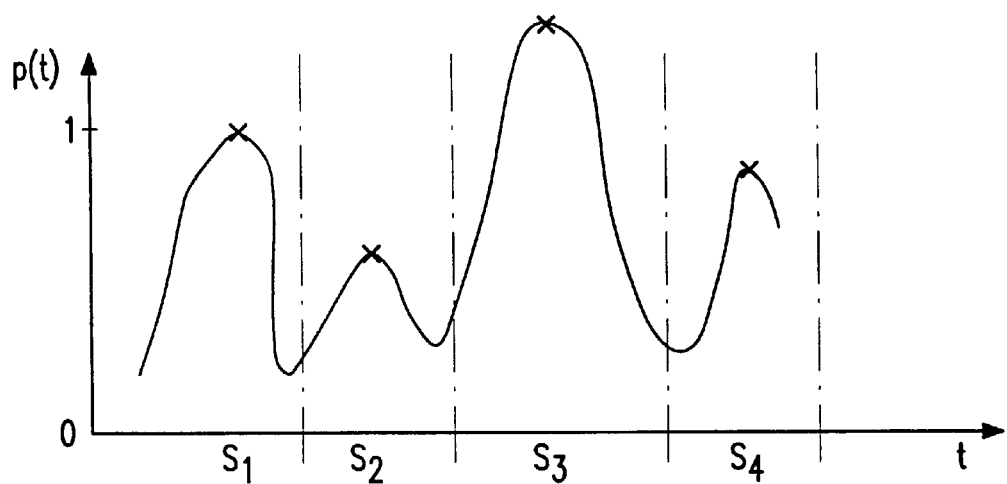
FIG. 10, ditto of the pressure signal of text.

FIG. 10 shows the deriving of aggregated feature vectors as based on pressure signal of text, which in particular is useful for signature recognition or verification. By themselves, either of these usages of signatures is old; the main distinction versus standard text is that mapping on separate characters is superfluous. Instantaneous pressure is correlated with starting and terminating of the various segments or frames as shown in FIG. 8. In the Figure, the pressure has been entered as a function of time. Experimentally it has been verified that the pressure is often highest in the middle of a segment that on the writing surface runs primarily in a vertical direction; the relevant points have been indicated by crosses and have respective pressure values $p_1 \ldots p_4$. Now, the aggregated feature vector can, for example, be expressed as:

$$o_4' = (o_4, p_4/(p_3+p_4), p_4/(p_2+p_4), p_4/(p_1+p_4)).$$

Various other derivations of the aggregated feature values are feasible.

Figure 11:
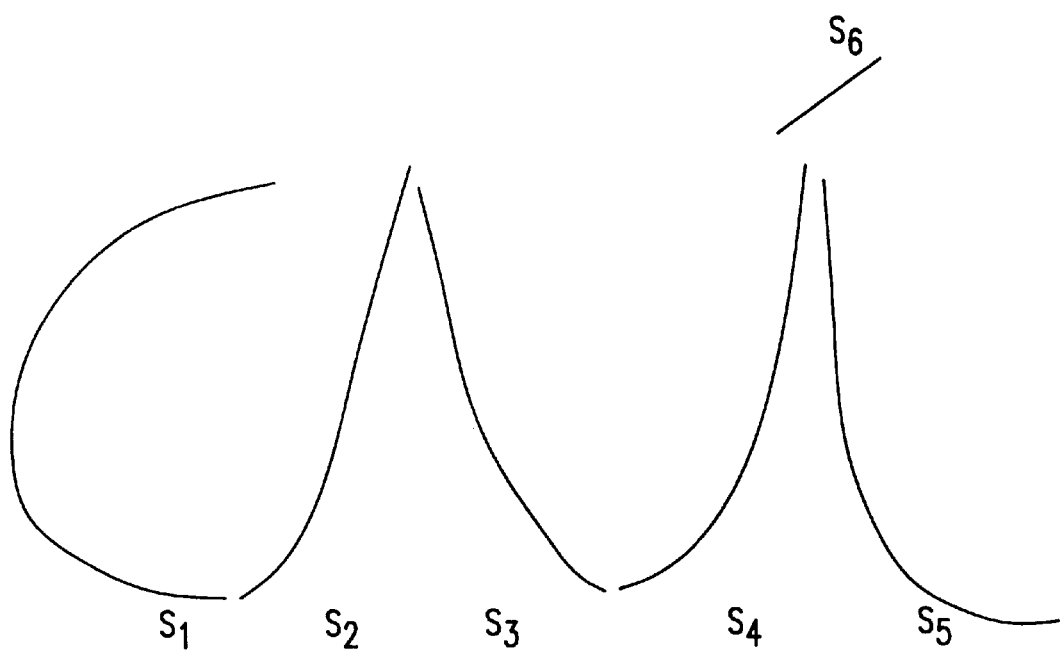
FIG. 11, ditto of the so-called 'hat'-feature.

FIG. 11 exemplifies the so-called 'hat-feature': this feature means that certain parts of the handwriting are not written in their standard order. Such occurs most often with accents, dots on letters like i and j, horizontal strokes in the letter t and the like. FIG. 11 is an example of the writing of the letter sequence 'ai', that has been divided into five standard segments $s_1$ to $s_5$, and a single hat segment $s_6$ corresponding to the dot on the letter i. The superposition of the 'hat' can be given as overlapping in a vertical direction versus non-overlapping of a particular earlier segment, in exceptional cases of a later segment. Another occurrence is that segments generated during the continuous writing overlap each other, if a small loop occurs. The occurring or non-occurring may be specified by a single bit with respect to all preceding segments combined: an example of the aggregating could then be that the count is formed as a quantity: (2/(maximum delay)). Another implementation is to express the hat feature as a respective bit relative to each preceding segment that is considered relevant, such as the three most recent segments: this leads to a bit string. The aggregating then can be done by calculating a function of these various bits.

Another implementation is to give the overlap as a multivalued or an analog quantity, such as the overlap between segments $(s_6, s_5)$ as measured in distance or in a number of sample points. For the hat segment, this then could lead to a string of analog values. This string can then be aggregated with a particular property of the hat segment itself. A still further development is to even combine the various overlap distances in an associated function f((overlap($s_6,s_5$), overlap ($s_6,s_4$), This function then is aggregated with a particular property of the hat segment itself.

FURTHER DESCRIPTION OF THE PERFORMANCE

We have used an unconstrained, writer-independent, hidden Markov model (HMM) based on an on-line handwriting recognition system. The principal effort is feature extraction, i.e. finding a suitable representation of a portion of the scribble sequence recorded on a tablet. The feature vector should contain all information relevant for subsequent classification, be insensitive to irrelevant variations, and at the same time have a low vector dimension. The following results were achieved.

The genericity of the approach has been verified; state-of-the-art recognition results have been produced. Essentially the same system was used for the recognizing discrete characters and continuous input and for 200 and 20,000 words vocabulary, with and without language model. The recognition accuracy obtained, e.g. up to 90% correct for a 20,000 word cursive recognition task without language model, compares well with other published results.

For obtaining a writing size invariant system, we compared two representations, frames and segments, which differ in the way adjacent samples are grouped into feature vectors. In a frame representation a constant number of samples contribute to one feature vector, and resulted in a better peak performance. For segments the boundaries between samples represented by the same feature vector; they are defined by the vertical handwriting speed being zero, and are more robust with respect to writing size. The error rate was hardly affected by scale variations of tip to a factor of eight.

The invention in particular relates to the concept of delayed features. Delayed features provide a flexible framework to integrate handwriting-specific knowledge into the representation by expressing structural relations between current and previous observation vectors. Not only the computation of angles between the center-of-gravities and size relations of subsequent features is possible but more complex relations like the "hat feature" can be computed too. The incorporation of delayed features will lower the error rate by 50%. We also experimented with delta features, as they are known from speech recognition, and obtained similar improvements, however with a quite higher vector dimension.

Linear discriminant analysis (LDA) allowed to obtain a representation maximally compact with respect to a discrimination criterion. The vector dimension could be reduced by a factor of two without performance degradation.

2. BASELINE SYSTEM

The platform for capturing handwriting is a proprietary tablet consisting of an LCD plus orthogonal sensors for pen and finger input sampling (x,y,p) with up to 200 pps. This tablet is connected to a PC with PenWindows. Data is filtered and, depending on representation, spatially resampled. Each character is modeled by a left-to-right Hidden Markov Model with loop, forward and skip transitions between the states. The observation probabilities are continuous mixtures of Gaussian densities with density specific diagonal covariance matrices. Training of the HMM parameters is done by using the Maximum Likelihood criterion and applying the Viterbi approximation. Recognition is based on the one-stage beam search algorithm using a tree-organized dictionary. All knowledge sources (the pen signal, the dictionary, and for some experiments, a language model) are applied at once, thus avoiding all premature decisions.

For the experiments, the training data consisted of more than 10,000 words from about 60 writers and several nationalities from on-site collected data and Unipen training data. Essentially the same recognizer was employed for the recognition of characters, words or whole sentences for a 200 words and a 20,000 words dictionary. The HMM framework is able to simultaneously determine the optimal segmentation and carry out the decoding. We obtained word recognition rates of 90% up to 99% for the 200 word vocabulary, 73% to 90% correct words for a 20K word vocabulary without language model. These results compare well with other published(d results for unconstrained handwriting recognition. Initial experiments on sentence recognition have also been conducted.

3. WRITING SIZE INVARIANCE

Like writing and sample speed, writing size is often explicitly normalized. This approach is suitable for recognizing isolated words where all input is available before normalization, but less appropriate for on-line recognition where preprocessing and recognition are done simultaneously. As an alternative we investigated size-independent representations.

Two alternatives were studied for grouping samples into blocks of which a feature vector is computed. For segments, the block borders are determined using the criterion that the vertical handwriting speed is zero: $v_y=0$. In contrast, a frame consists of a fixed number of consecutive, resampled points. Resampling the pen trajectory is necessary to obtain equi-spaced points and thus compensate for writing speed variations. In both cases the sample blocks were used to compute adjacent feature vectors were chosen to overlap by 50%. On the average there were about 10 frames (7 segments) per character corresponding to 7 (5) states per model.

The feature vectors were identical for frames and for segments and contained 13 low-level features like aspect ratio, path length, 5 angles, a pen-down feature, and four so-called delayed features.

To test writing size dependence, 10 writers wrote a set of 50 words in four different sizes (scale: 0.5, 1, 2, 4; where scale 1 corresponds to the average writing size of the training data). Writers were instructed to write lower case were not constrained otherwise. The resulting set of 4 times 500 words was represented by either frames or segments and recognized using a 200 and 20K word vocabulary. The results presented in Table 1 clearly show that, while frames have a better peak performance (of up to 99% correct words), the segments are essentially independent of the writing size.

Table 1: Comparison of frames and segments for four different writing sizes. The table contains recognition rates in % for a 200 and 20,000 word dictionary, respectively.

| 200 word dictionary | | | | |
|---|---|---|---|---|
| Size | 0.5 | 1 | 2 | 4 |
| Frame | 82.1 | 99.0 | 68.8 | 2.7 |
| Segment | 96.8 | 96.8 | 98.0 | 97.1 |
| 20,000 word dictionary | | | | |
| Size | 0.5 | 1 | 2 | 4 |
| Frame | 55.5 | 90.2 | 33.7 | 0.0 |
| Segment | 82.5 | 83.3 | 85.3 | 81.8 |

4. DELAYED AND DELTA FEATURES

Features that describe consistent trends in the handwriting over several points can improve recognition accuracy. One method is to splice adjacent frames to an enlarged feature vector. Here we investigated alternative approaches.

Let $o_t$ denote a feature of the current frame t. A way to describe the dynamics of the handwriting signal, which has been adopted from speech recognition, is the use of delta features, i.e. approximations to the derivatives of the observation vector versus time, e.g.:

$$\Delta o_t = \tfrac{1}{2}(o_{t+1} - o_{t-1})$$

The novel delayed features indicate the spatial dynamics of the handwriting signal by computing relative angles between the X-axis and a line connecting centers-of-gravity, and further size relations between subsequent feature vectors. For a delay n=2, the features $\sin(\text{angle}(\text{cog}(o_t), \text{cog}(o_{t-2})))$, $\cos(\text{angle}(\text{cog}(o_t), \text{cog}(o_{t-2})))$ describe the change of writing direction between feature vectors $o_{t-2}$ and $o_t$. This concept of delayed features further allows to define a so-called "hat-feature".

Based on 500 normal-sized words of the scalability test, we compared the performance of a baseline representation (13-component feature vector) versus feature vectors which included delta and delayed features, respectively. Table 2 shows that the augmented feature vector outperforms the baseline representation, delta and delayed features performing similarly well. In the case of the delayed features, however, fewer additional vector components are required to improve the performance.

Table 2: Recognition rates (in %) for segment type of feature vector for a 200 word and a 20,000 word dictionary.

| # features | 13 | 13 + 6 delayed | 13 + 13 delta |
|---|---|---|---|
| 200 W | 91.4 | 96.8 | 96.7 |
| 20,000 W | 71.7 | 83.3 | 81.0 |

5. LINEAR DISCRIMINANT ANALYSIS

Linear discriminant analysis (LDA) is used for compressing the information contents (with respect to classification) of a feature vector by a linear transformation. After the feature vector had been augmented by delta or delayed features the resulting vector was transformed by an LDA transformation. Then a certain number of features corresponding to the largest eigenvalues were retained while the other features were discarded. By doing so the vector dimension could be reduced by a factor of two without performance degradation.

6. REFERENCES

E. J. Bellegarda, J. R. Bellegarda, D. Nahamoo, and K. S. Nathan. A Fast Statistical Mixture Algorithm for On-line Handwriting Recognition. IEEE Transactions on Pattern Analysis and Machine Intelligence, 16(12) p. 1227–1233, December 1994: describes letter recognition based on so-called splicing, that makes the feature vectors too large.

K. S. Nathan, H. S. M. Beigi, J. Subrahmonia, G. J. Clary, and H. Maruyama. Real-time On-line Unconstrained Handwriting Recognition Using Statistical Methods. In International Conference of Acoustics, Speech and Signal Processing, p. 2619–2622, 1995: describes complete handwriting recognition, based on HMM.

What is claimed is:

1. A method for on-line handwriting recognition based on a hidden Markov model, said method comprising the steps of:

real-time sensing at least an instantaneous write position of said handwriting;

deriving from said handwriting a time-conforming string of samples, and from said string a series of handwriting intervals each associated by derivation to a handwriting feature vector, including calculating a center of gravity from the samples associated with each handwriting interval, and wherein the feature vectors contain one or more vector elements that are based on local observations derived from a single said handwriting interval, said handwriting interval comprising a handwriting frame, as well as being based on one or more vector elements that are based on aggregated observations derived from time-spaced said intervals defined over an associated delay, wherein the aggregated feature vector elements are representable as $o'_1$ and $o'_2$ as follows:

$$o'_1 = \begin{matrix} o_1 \\ f_1(o_1 \ldots o_{1-d}) \\ f_2(o_1 \ldots o_{1-d}) \\ \ldots \\ f_m(o_1 \ldots o_{1-d}) \end{matrix} \qquad o'_2 = \begin{matrix} o_2 \\ f_1(o_2 \ldots o_{2-d}) \\ f_2(o_2 \ldots o_{2-d}) \\ \ldots \\ f_m(o_2 \ldots o_{2-d}) \end{matrix}$$

where $o_1$ and $o_2$ represent the vector elements that are based on local observations, d corresponds to a maximum value of the delay between successive frames, and m indicates a number of functions actually used;

matching the time-conforming sequence of feature vectors so derived to one or more example sequence modellings from a database pertaining to the handwriting in question;

selecting from said modellings a sufficiently-matching recognition string through hidden-Markov processing; and outputting essentials of a result of said selecting, or alternatively, rejecting said handwriting as failing to be recognized.

2. The method as claimed in claim 1, wherein the aggregated feature vector elements comprise differential angles derived from the centers of gravities associated to successive handwriting intervals.

3. A method as claimed in claim 1, wherein said feature vector elements to be aggregated include spatial path lengths between principal points associated to successive handwriting intervals.

4. A method as claimed in claim 1, wherein said aggregated feature vector elements define spatially contiguous character segments generated in a temporally non-sequential manner.

5. A method as claimed in claim 1, wherein said aggregated feature vector elements include contour changes between successive character segments in a direction transverse to a general orientation of a line or writing.

6. A method as claimed in claim 1, applied for signature recognition.

7. A method as claimed in claim 1, wherein at least one aggregated feature vector element is based on sensing instantaneous writing pressure.

8. A method as claimed in claim 1, wherein at least one aggregated feature vector element is based on sensing instantaneous writing instrument tilt.

9. A data processing system for handwriting recognition comprising:

a graphical input means for real-time sensing at least an instantaneous write position of handwriting and converting said handwriting information into a handwriting signal;

a handwriting processing means for receiving and processing said handwriting signal, for deriving from said handwriting a time-conforming string of samples and from said string a series of handwriting intervals each associated by derivation to a handwriting feature vector, and for calculating a center of gravity from the samples associated with each handwriting interval, and wherein said feature vectors contain one or more vector elements that are based on local observations derived from a single said handwriting interval, said handwriting interval being selected from the group consisting of a handwriting frame and a handwriting segment, as well as being based on one or more vector elements that are based on aggregated observations derived from time-spaced said intervals defined over an associated delay, wherein the aggregated feature vector elements are representable as $o'_1$ and $o'_2$ as follows:

$$o'_1 = \begin{matrix} o_1 \\ f_1(o_1 \ldots o_{1-d}) \\ f_2(o_1 \ldots o_{1-d}) \\ \ldots \\ f_m(o_1 \ldots o_{1-d}) \end{matrix} \qquad o'_2 = \begin{matrix} o_2 \\ f_1(o_2 \ldots o_{2-d}) \\ f_2(o_2 \ldots o_{2-d}) \\ \ldots \\ f_m(o_2 \ldots o_{2-d}) \end{matrix}$$

where $o_1$ and $o_2$ represent the vector elements that are based on local observations, d corresponds to a maximum value of the delay between successive frames or segments, and m indicates a number of functions actually used;

a handwriting model description database pertaining to the handwriting in question;

search and classification means for receiving a processed handwriting signal from the handwriting processing means, and for matching the time-conforming sequence of feature vectors so derived to one or more example sequence modeling from the handwriting model description database, and for selecting from said modeling a sufficiently-matching recognition string through hidden-Markov processing; and results output means for outputting essentials of a result of said selecting, or alternatively, for rejecting said handwriting as failing to be recognized.

10. A system according to claim 9, wherein said graphical input means comprises an electromagnetically operating writing tablet.

11. A method for on-line handwriting recognition based on a hidden Markov model, said method comprising the steps of:

real-time sensing at least an instantaneous write position of said handwriting;

deriving from said handwriting a time-conforming string of samples, and from said string a series of handwriting intervals each associated by derivation to a handwriting feature vector, including calculating a center of gravity from the samples associated with each handwriting interval, and wherein the feature vectors contain one or more vector elements that are based on local observations derived from a single said handwriting interval, said handwriting interval comprising a handwriting segment, as well as being based on one or more vector elements that are based on aggregated observations derived from time-spaced said intervals defined over an associated delay, wherein the aggregated feature vector elements are representable as $o'_1$ and $o'_2$ as follows:

$$\begin{array}{ll} o_1 & o_2 \\ f_1(o_1 \ldots o_{1-d}) & f_1(o_2 \ldots o_{2-d}) \\ o'_1 = f_2(o_1 \ldots o_{1-d}) & o'_2 = f_2(o_2 \ldots o_{2-d}) \\ \ldots & \ldots \\ f_m(o_1 \ldots o_{1-d}) & f_m(o_2 \ldots o_{2-d}) \end{array}$$

where $o_1$ and $o_2$ represent the vector elements that are based on local observations, d corresponds to a maximum value of the delay between successive segments, and m indicates a number of functions actually used;

matching the time-conforming sequence of feature vectors so derived to one or more example sequence modellings from a database pertaining to the handwriting in question;

selecting from said modellings a sufficiently-matching recognition string through hidden-Markov processing; and outputting essentials of a result of said selecting, or alternatively, rejecting said handwriting as failing to be recognized.

12. The method as claimed in claim 11, wherein the aggregated feature vector elements comprise differential angles derived from the centers of gravities associated to successive handwriting intervals.

13. The method as claimed in claim 11, wherein said feature vector elements to be aggregated include spatial path lengths between principal points associated to successive handwriting intervals.

14. The method as claimed in claim 11, wherein said aggregated feature vector elements include signallings that spatially contiguous character segments are generated in a temporally non-sequential manner.

15. The method as claimed in claim 11, wherein said aggregated feature vector elements include contour changes between successive character segments in a direction transverse to a general orientation of a line or writing.

16. The method as claimed in claim 11, applied for signature recognition.

17. The method as claimed in claim 11, wherein at least one aggregated feature vector element is based on sensing instantaneous writing pressure.

18. The method as claimed in claim 11, wherein at least one aggregated feature vector element is based on sensing instantaneous writing instrument tilt.

* * * * *